US012334616B2

(12) United States Patent
Guo et al.

(10) Patent No.: US 12,334,616 B2
(45) Date of Patent: Jun. 17, 2025

(54) PHASE SHIFTER AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Jingwen Guo, Beijing (CN); Qianhong Wu, Beijing (CN); Chunxin Li, Beijing (CN); Feng Qu, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,592

(22) PCT Filed: Mar. 28, 2022

(86) PCT No.: PCT/CN2022/083342

§ 371 (c)(1),
(2) Date: Feb. 16, 2023

(87) PCT Pub. No.: WO2023/184078

PCT Pub. Date: Oct. 5, 2023

(65) Prior Publication Data

US 2024/0266705 A1 Aug. 8, 2024

(51) Int. Cl.
*H01P 1/18* (2006.01)

(52) U.S. Cl.
CPC .................................... *H01P 1/182* (2013.01)

(58) Field of Classification Search
CPC ............. H01P 1/182; H01P 1/184; H01P 1/18
USPC .................................................. 333/161, 186
See application file for complete search history.

(56) References Cited

U.S. PATENT DOCUMENTS 7,259,641 B1 * 8/2007 Weller .................... H01P 1/184
333/156

* cited by examiner

*Primary Examiner* — Jorge L Salazar, Jr.
(74) *Attorney, Agent, or Firm* — HOUTTEMAN LAW LLC

(57) ABSTRACT

A phase shifter and an electronic device are provided, and belong to the field of communication technology. The phase shifter includes: a first dielectric substrate; and a first feed structure, a second feed structure and a phase shifting structure. The phase shifting structure includes: a first signal electrode, at least one first reference electrode, a first insulating layer and at least one phase control unit. Each phase control unit is on a side of the first insulating layer away from the first dielectric substrate and includes at least one film bridge; there is a gap between a bridge deck of the film bridge and the first insulating layer; and an orthographic projection of a bridge deck of the film bridge on the first dielectric substrate overlaps with orthographic projections of the first signal electrode and the at least one first reference electrode on the first dielectric substrate.

20 Claims, 7 Drawing Sheets

PHASE SHIFTER AND ELECTRONIC DEVICE

TECHNICAL FIELD

The present disclosure relates to the field of communication technology, and in particular to a phase shifter and an electronic device.

BACKGROUND

With the rapid development of the information age, a wireless terminal with high integration, miniaturization, multifunction, and low cost has gradually become a trend of the communication technology. A phase shifter is an essential key component in communication and radar applications. The traditional phase shifter mainly includes a ferrite phase shifter and a semiconductor phase shifter. The ferrite phase shifter has a larger power capacity and a low insertion loss, but is limited in the large-scale application by factors such as a complex process, a high manufacturing cost, a large footprint or the like. The semiconductor phase shifter has a small footprint, a high operating speed, but has a smaller power capacity, a larger power consumption and a high process difficulty.

Compared with the traditional phase shifter, a micro-electro-mechanical system (MEMS) phase shifter in the prior art has significant advantages in the aspects of an insertion loss, a power consumption, a footprint, a cost and the like, and has attracted a wide attention in the radio communication technology, the microwave technology and the like.

SUMMARY

The present disclosure is directed to at least one of the problems of the prior art, and provides a phase shifter and an electronic device.

In a first aspect, the embodiment of the present disclosure provides a phase shifter, including: a first dielectric substrate; and a first feed structure, a second feed structure and a phase shifting structure, which are all arranged on the first dielectric substrate; the phase shifting structure includes: a first signal electrode and at least one first reference electrode on at least one side of an extending direction of the first signal electrode; a first insulating layer on a side of a layer, where the first signal electrode and the at least one first reference electrode are located, away from the first dielectric substrate; the first insulating layer covers the at least one first reference electrode and the first signal electrode; and at least one phase control unit on a side of the first insulating layer away from the first dielectric substrate; each phase control unit includes at least one film bridge; there is a gap between a bridge deck of each film bridge and the first insulating layer; and an orthographic projection of a bridge deck of each film bridge on the first dielectric substrate overlaps with orthographic projections of the first signal electrode and the at least one first reference electrode on the first dielectric substrate; the first feed structure includes a second signal electrode; the second feed structure includes a third signal electrode; and the second signal electrode and the third signal electrode are respectively connected to a first end and a second end of the first signal electrode; and the phase shifter further includes at least one first bias signal line connected to the second signal electrode or the third signal electrode.

In some embodiments, the second signal electrode includes a first main body portion and a first feed port connected to the first main body portion and the first end of the first signal electrode; and a line width of a portion of the first feed port close to the first signal electrode is not greater than that of a portion of the first feed port away from the first signal electrode; and the third signal electrode includes a second main body portion and a second feed port connected to the second main body portion and a second feed port connected to the second main body portion and the second end of the first signal electrode; and a line width of a portion of the second feed port close to the first signal electrode is not greater than that of a portion of the second feed port away from the first signal electrode.

In some embodiments, the first feed port includes a first sub-structure and a second sub-structure connected to each other; the first sub-structure is connected to the first main body portion; the second sub-structure is connected to the first end of the first signal electrode; a line width of the second sub-structure is smaller than that of any portion of the first sub-structure; and a line width of the first sub-structure is gradually decreased in a direction from the first main body portion to the first signal electrode; and the second feed port includes a third sub-structure and a fourth sub-structure connected to each other; the third sub-structure is connected to the second main body portion; the fourth sub-structure is connected to the second end of the first signal electrode; a line width of the fourth sub-structure is smaller than that of any portion of the third sub-structure; and a line width of the third sub-structure is gradually decreased in a direction from the second main body portion to the first signal electrode.

In some embodiments, the at least one first bias signal line is connected to the first main body portion or the second main body portion.

In some embodiments, the first feed structure further includes at least one second reference electrode on at least one side of an extending direction of the second signal electrode; and the second feed structure further includes at least one third reference electrode on at least one side of an extending direction of the third signal electrode.

In some embodiments, when the at least one first bias signal line is connected to the second signal electrode, one second reference electrode includes a first electrode segment and a second electrode segment separated from each other, and a first bridge segment connecting the first electrode segment and the second electrode segment; an orthographic projection of the at least one first bias signal line on the first dielectric substrate passes through a space between orthographic projections of the first electrode segment and the second electrode segment on the first dielectric substrate; and the at least one first bias signal line and the first bridge segment are insulated from each other; and when the at least one first bias signal line is connected to the third signal electrode, one third reference electrode includes a third electrode segment and a fourth electrode segment separated from each other, and a second bridge segment connecting the third electrode segment and the fourth electrode segment; the orthographic projection of the at least one first bias signal line on the first dielectric substrate passes through a space between orthographic projections of the third electrode segment and the fourth electrode segment on the first dielectric substrate; and the at least one first bias signal line and the second bridge segment are insulated from each other.

In some embodiments, when the at least one first bias signal line is connected to the second signal electrode, one second reference electrode includes the first electrode segment and the second electrode segment separated from each other, and the first bridge segment connecting the first electrode segment and the second electrode segment, a second insulating layer is filled between the first bridge segment and a layer where the at least one first bias signal line is located; and when the at least one first bias signal line is connected to the third signal electrode, one third reference electrode includes the third electrode segment and the fourth electrode segment separated from each other, and the second bridge segment connecting the third electrode segment and the fourth electrode segment, a third insulating layer is filled between the second bridge segment and the layer where the at least one first bias signal line is located.

In some embodiments, when the at least one first bias signal line is connected to the second signal electrode, one second reference electrode includes the first electrode segment and the second electrode segment separated from each other, and the first bridge segment connecting the first electrode segment and the second electrode segment, the first bridge segment includes a plurality of first bridge sub-segments separated from each other, any one of the plurality of first bridge sub-segments electrically connects the first electrode segment and the second electrode segment; and when the at least one first bias signal line is connected to the third signal electrode, one third reference electrode includes the third electrode segment and the fourth electrode segment separated from each other, and the second bridge segment connecting the third electrode segment and the fourth electrode segment, the second bridge segment includes a plurality of second bridge sub-segments separated from each other, and any one of the plurality of second bridge sub-segments electrically connects the third electrode segment and the fourth electrode segment.

In some embodiments, an orthographic projection of the at least one first bias signal line on the first dielectric substrate does not overlap with orthographic projections of the at least one second reference electrode and the at least one third reference electrode on the first dielectric substrate.

In some embodiments, the at least one second reference electrode is on two sides of an extending direction of the second signal electrode; and/or the at least one third reference electrode is on two sides of an extending direction of the third signal electrode.

In some embodiments, the at least one first bias line includes a meandering line.

In some embodiments, the at least one phase control unit includes a plurality of phase control units; and the numbers of the film bridges in different phase control units are different from each other.

In some embodiments, the phase shifter further includes at least one second bias signal line; all of the film bridges in each phase control unit are electrically connected to a same second bias signal line.

In some embodiments, the first signal electrode, the second signal electrode, the third signal electrode and the at least one first bias signal line are in a same layer and are made of a same material.

In some embodiments, the at least one first reference electrode is on both sides of the extending direction of the first signal electrode.

In a second aspect, an embodiment of the present disclosure provides an antenna, which includes the phase shifter in any one of the above embodiments.

DETAIL DESCRIPTION OF EMBODIMENTS

Figure 1:
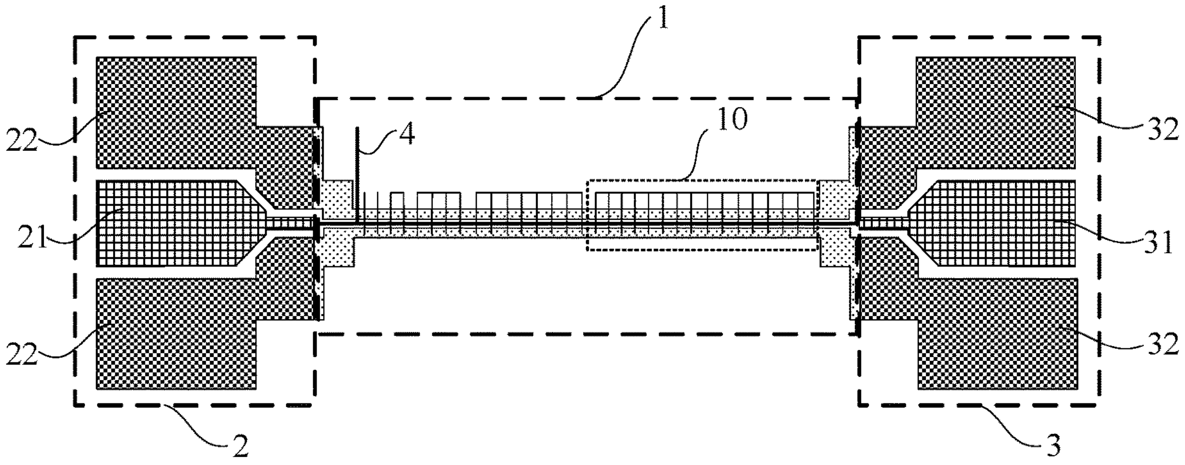
FIG. 1 is a schematic diagram of a structure of an exemplary phase shifter.

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

It should be noted that in the present disclosure, two structures are "disposed in a same layer", which means that the two structures are formed of a same material layer, and thus the two structures are in a same layer in the laminated relationship, but does not mean that the two structures are equidistant from a substrate, nor that other layer structures between the two structures and the substrate are completely the same.

The present disclosure will be described in more detail below with reference to the accompanying drawings. Like elements are denoted by like reference numerals throughout the various drawings. For purposes of clarity, the various features in the drawings are not drawn to scale. Moreover, certain well-known features may not be shown in the drawings.

Figure 2:
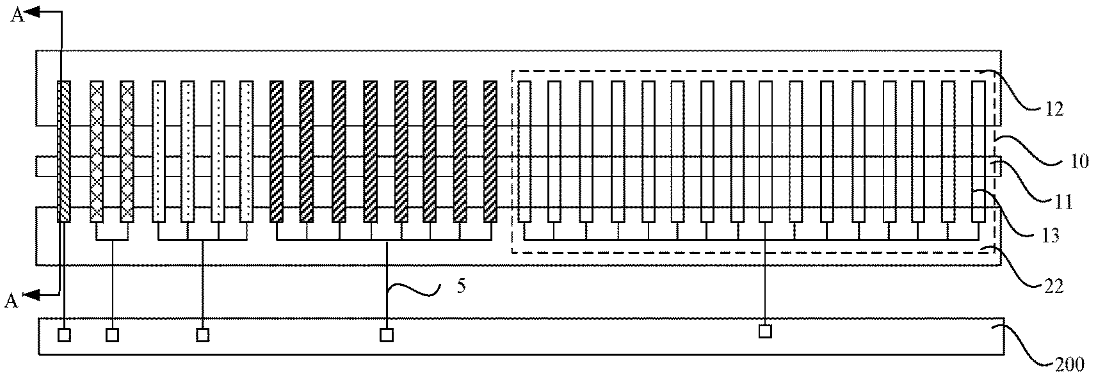
FIG. 2 is a schematic diagram of a phase shifting structure in the phase shifter of FIG. 1.
Figure 3:
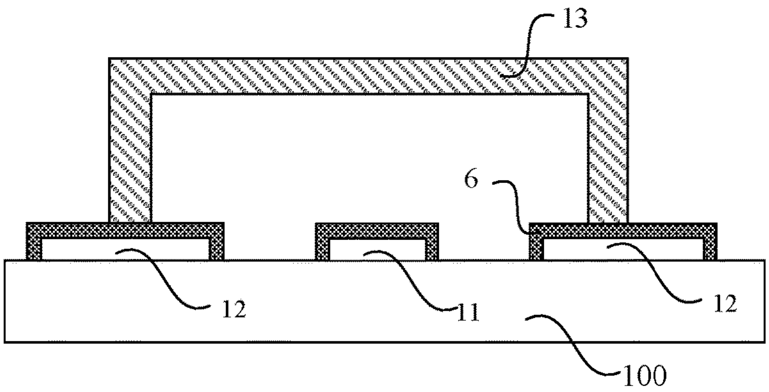
FIG. 3 is a cross-sectional view taken along a line A-A' of FIG. 2.

In a first aspect, FIG. 1 is a schematic diagram of a structure of an exemplary phase shifter. FIG. 2 is a schematic diagram of a phase shifting structure in the phase shifter of FIG. 1. FIG. 3 is a cross-sectional view taken along a line A-A' of FIG. 2. As shown in FIGS. 1 to 3, the phase shifter includes a first dielectric substrate 100, a first feed structure 2, a second feed structure 3, and a phase shifting structure 1 disposed on the first dielectric substrate 100. When one of the first and second feed structures 2 and 3 is used as a feed-in port for a radio frequency signal, the other one is used as a feed-out port for the radio frequency signal. That is, the first and second feed structures 2 and 3 are used as the feed-in port or the feed-out port for the radio frequency signal, which is in relative terms. For convenience of description, in the embodiment of the present disclosure, as an example, the first feed structure 2 is used as the feed-in port for the radio frequency signal, and the second feed structure 3 is used as the feed-out port for the radio frequency signal.

The phase shifting structure 1 in the phase shifter includes a first signal electrode 11, at least one first reference electrode 12, a first insulating layer 6, at least one phase control unit 10 (a plurality of the phase control units 10 as shown in FIG. 2 as an example), at least one first bias signal line 4 and at least one second bias signal line 5.

Specifically, the first signal electrode 11 is disposed on the first dielectric substrate 100, and the at least one first reference electrode 12 is disposed on at least one side of an extending direction of the first signal electrode 11. In the embodiment of the present disclosure, the phase shifting structure 1 includes two first reference electrodes 12, which are disposed on both sides of the extending direction of the first signal electrode 11. In this case, the first signal electrode 11 and the two first reference electrodes 12 constitute a coplanar waveguide (CPW) transmission line. The first insulating layer 6 is disposed on a side of the first reference electrodes 12 and the first signal electrode 11 away from the first dielectric substrate 100, and covers the first signal electrode 11 and the first reference electrodes 12. The plurality of phase control units 10 are arranged on a side of the first insulating layer 6 away from the first dielectric substrate 100. Each phase control unit 10 has one or more film bridges 13, each bridging between two first reference electrodes 12. That is, each film bridge includes a support portion and a bridge deck, one end of the support portion is connected to the bridge deck, and the other end of the support portion is fixed to the first insulating layer 6 covering the first reference electrodes 12, so that the bridge deck of the film bridge 13 is suspended above the first signal electrode 11, so that there is a gap between the bridge deck of the film bridge 13 and the first signal electrode 11. An orthographic projection of the film bridge 13 on the first dielectric substrate 100 at least partially overlaps with the orthographic projection of the first signal electrode 11 on the first dielectric substrate 100, so that if a first direct current bias voltage is input to the first signal electrode 11 through the at least one first bias signal line 4 and a second direct current bias voltage is input to the film bridge 13 through the at least one second bias signal line 5, the film bridge 13 can form a capacitor with the first signal electrode 11. The bridge deck of the film bridge 13 has certain elasticity, so that when the second direct current bias voltage is input to the film bridge 13, the bridge deck of the film bridge 13 can be driven to move in a direction perpendicular to the first signal electrode 11. That is, when the second direct current bias voltage is input to the film bridge 13, a distance between the bridge deck of the film bridge 13 and the first signal electrode 11 can be changed, so that a capacitance of the capacitor formed by the bridge deck of the film bridge 13 and the first signal electrode 11 can be changed. The different phase control units 10 include different numbers of the film bridges 13, and the film bridges 13 of the same phase control unit 10 are connected to one output port of a control unit 200 through a same second bias signal line 5 to receive the second direct current bias voltage output by the control unit 200. After direct current bias voltages are applied to a certain number of film bridges 13 in different phase control units 10 and the first signal electrode 11, the distributed capacitances having different magnitudes are generated, so that different phase shift amounts are correspondingly adjusted. That is, each phase control unit 10 correspondingly adjusts one phase shift amount (the film bridges 13 of the same filling pattern belong to the same phase control unit 10, as shown in FIG. 2), so that when the phase shift amount is adjusted, a voltage applied to the corresponding phase control unit is controlled according to the magnitude of the phase shift amount to be adjusted.

The inventors have found that the first bias signal line 4 is typically in direct electrical connection with the first signal electrode 11 to provide the first direct current bias voltage for the first signal electrode 11. The first bias signal line 4 is made of ITO (indium tin oxide) with a high resistance and a narrow line width, so that a part of the radio frequency signal is coupled to the first reference electrode 12 through the first bias signal line 4 according to a circuit shunting principle, thereby causing a high insertion loss.

Figure 4:
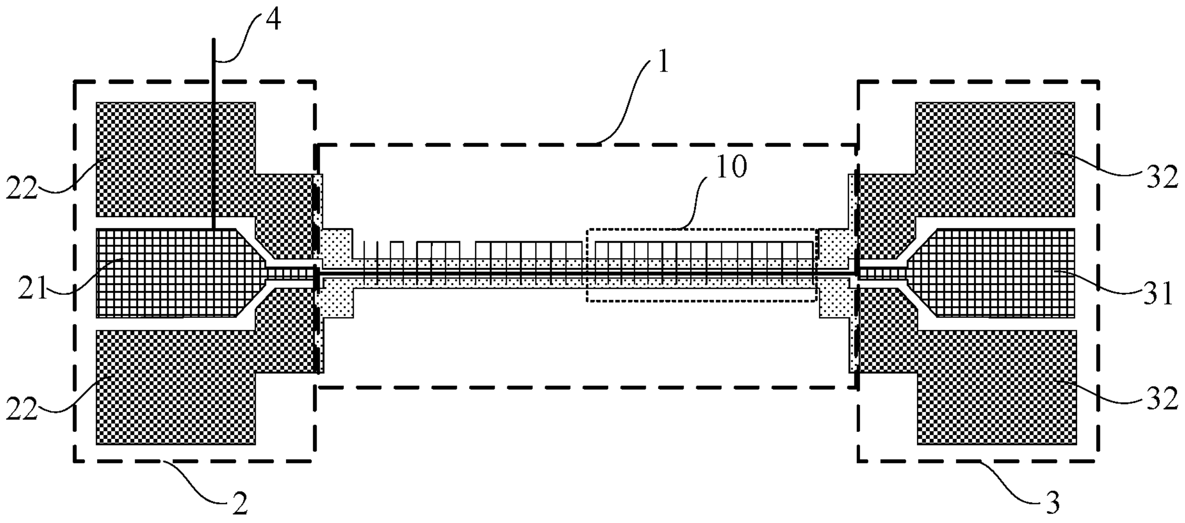
FIG. 4 is a schematic diagram of a structure of a phase shifter according to an embodiment of the present disclosure.

FIG. 4 is a schematic diagram of a structure of a phase shifter according to an embodiment of the present disclosure. As shown in FIG. 4, in the phase shifter according to an embodiment of the present disclosure, the first feed structure 2 at least includes a second signal electrode 21, and the second feed structure 3 at least includes a third signal electrode 31. The at least one first bias signal line 4 is electrically connected to the second signal electrode 21 or the third signal electrode 31. It can be understood that a line width of each of the second signal electrode 21 and the third signal electrode 31 are greater than that of the first signal electrode 11, that is, a resistance of the second signal electrode 21/the third signal electrode 31 per unit length is less than that of the first signal electrode 11, so that the loss of signal transmission for the first signal electrode 11 can be significantly reduced.

In some examples, the first feed structure 2 and the second feed structure 3 may both adopt CPW transmission lines. That is, the first feed structure 2 includes not only the second signal electrode 21 but also at least one second reference electrode 22 located on at least one side of an extending direction of the second signal electrode 21. In the embodiment of the present disclosure, as an example, the second reference electrodes 22 are provided on two sides of the extending direction of the second signal electrode 21. Similarly, the second feed structure 3 includes not only the third signal electrode 31, but also at least one third reference electrode 32 located on at least one side of an extending direction of the third signal electrode 31. In the embodiment of the present disclosure, as an example, the third reference electrodes 32 are provided on two sides of the extending direction of the third signal electrode 31.

Figure 5:
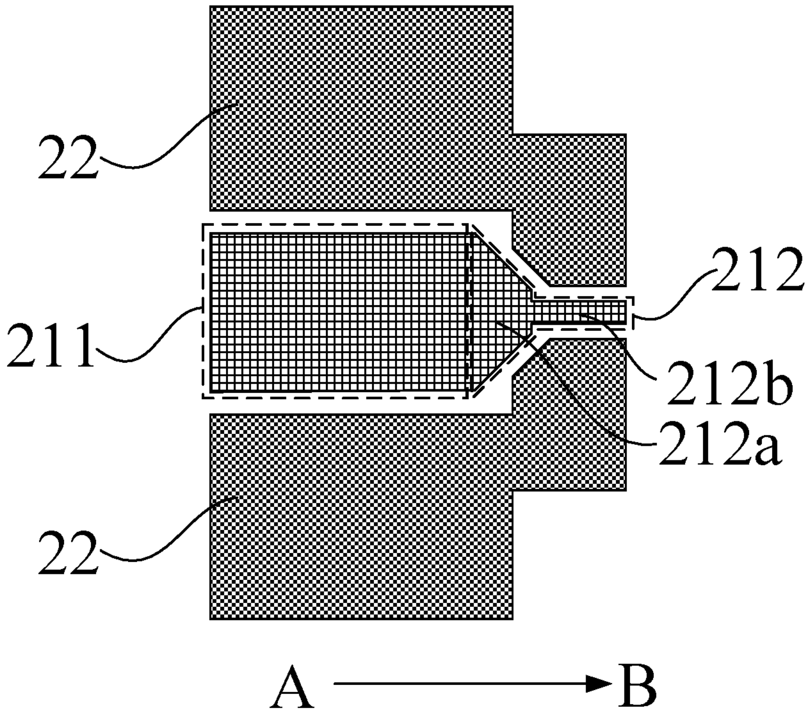
FIG. 5 is a schematic diagram of a first feed structure of a phase shifter according to an embodiment of the present disclosure.

Further, FIG. 5 is a schematic diagram of a first feed structure 2 of a phase shifter according to an embodiment of the present disclosure. As shown in FIG. 5, the first feed structure 2 may include a first main body portion 211 and a first feed port 212 connected between the first main body portion 211 and a first end of the first signal electrode 11. A line width of a portion of the first feed port 212 close to the first signal electrode 11 is not greater than that of a portion of the first feed port 212 away from the first signal electrode 11. For example: the first feed port 212 includes a first sub-structure 212*a* and a second sub-structure 212*b* connected to each other; the first sub-structure 212*a* is connected between the first main body portion 211 and the second sub-structure 212*b*, and the second sub-structure 212*b* is connected between the first sub-structure 212*a* and the first end of the first signal electrode 11. A line width of the second sub-structure 212*b* is smaller than that of any portion of the first sub-structure 212*a*. A line width of the first sub-structure 212*a* is gradually decreased in a direction from the first main body portion 211 to the first signal electrode 11 (in the A→B direction shown in FIG. 5).

The second sub-structure 212*b* may be a stripe structure with a uniform line width. The first and second sub-structures 212*a* and 212*b*, the first main body portion 211, and the first signal electrode 11 may have a one-piece structure. That is, the second signal electrode 21 and the first signal electrode 11 may be formed in one patterning process, which is helpful for realizing high integration of the phase shifter. Further, the first reference electrodes 12 and the second reference electrodes 22 and the first signal electrode 11 and the second signal electrode 21 may be disposed in the same layer, and be made of the same material. That is, the first reference electrodes 12 and the second reference electrodes 22 may be formed while the first signal electrode 11 and the second signal electrode 21 are formed, so that a thickness of the phase shifter can be further reduced, and the integration of the phase shifter can be improved.

Figure 6:
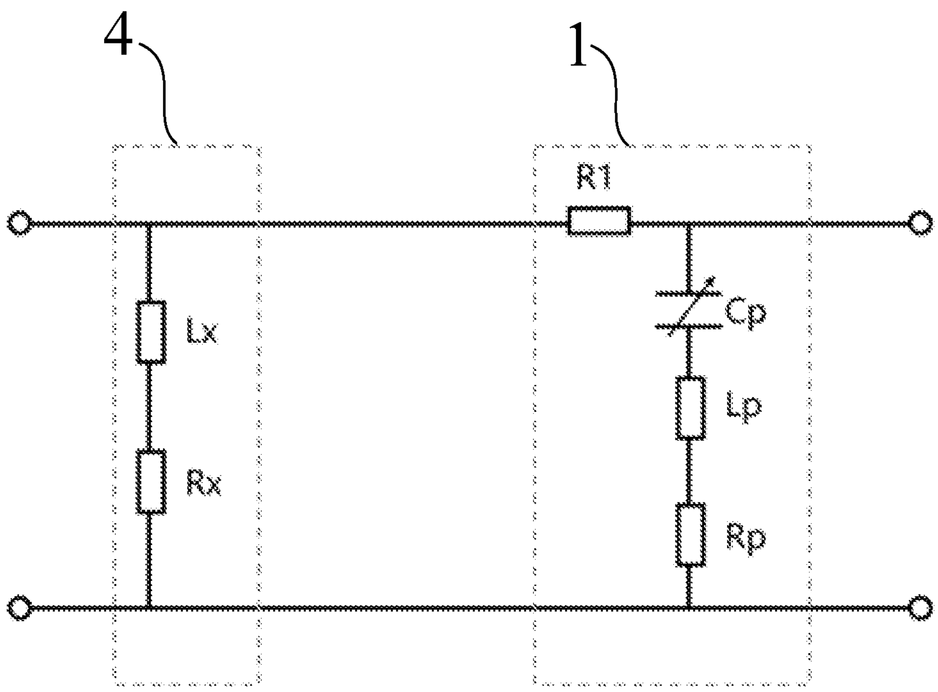
FIG. 6 is an equivalent circuit diagram showing a connection between a first bias signal line and a first signal electrode.
Figure 7:
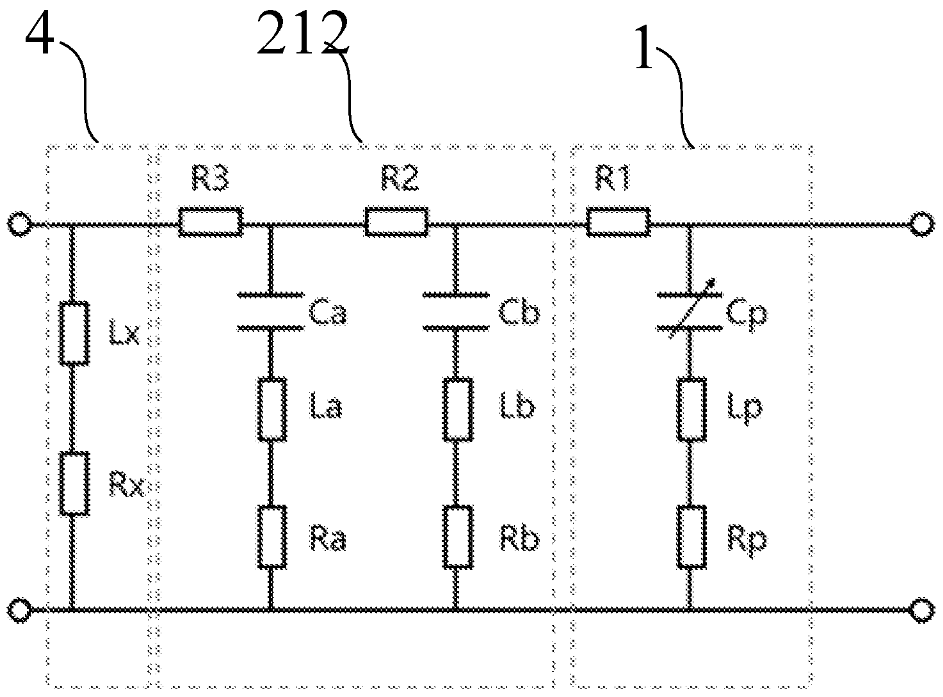
FIG. 7 is an equivalent circuit diagram showing a connection between a first bias signal line and a second signal electrode.

FIG. 6 is an equivalent circuit diagram showing a connection between a first bias signal line and a first signal electrode. FIG. 7 is an equivalent circuit diagram showing a connection between a first bias signal line and a second signal electrode. As shown in FIGS. 6 and 7, the bias signal line is equivalent to resistors and inductors (Rx and Lx) connected in series, and the phase shifting structure is equivalent to resistors, inductors and capacitors (R1, Rp, Cp and Lp) connected in series and parallel. When the at least one first bias signal line 4 is electrically connected to the first main body portion 211, the first feed port 212 of the first feed structure 2 is equivalent to an impedance transformation structure. That is, the first sub-structure 212*a*, the second sub-structure 212*b* and the second reference electrode 22 constitute resistors, capacitors and inductors (Ca, Cb, R3, R2, La, Lb, Ra and Rb) connected in series and parallel. According to the principle for resistors connected in parallel, comparing with a case where the at least one first bias signal line 4 is connected to the first signal electrode 11, by connecting the at least one first bias signal line 4 to the first main body portion 211, the loss of the signal transmission for the first signal electrode 11 can be effectively reduced, and the shunting of the radio frequency signal by the at least one first bias signal line 4 can be significantly reduced, and the insertion loss of the whole device in the operating state can be reduced.

Similarly, the second feed structure 3 may include a second main body portion and a second feed port connected between the second main body portion and a first second of the first signal electrode 11. A line width of a portion of the second feed port close to the first signal electrode 11 is not greater than that of a portion of the second feed port away from the first signal electrode 11. For example: the second feed port includes a third sub-structure and a fourth sub-structure connected to each other; the third sub-structure is connected between the second main body portion and the fourth sub-structure, and the fourth sub-structure is connected between the third sub-structure and the second end of the first signal electrode 11. A line width of the fourth sub-structure is smaller than that of any portion of the third sub-structure. A line width of the third sub-structure is gradually decreased in a direction from the second main body portion to the first signal electrode 11.

The fourth sub-structure may be a stripe structure with a uniform line width. The third and fourth sub-structures, the second main body portion, and the first signal electrode 11 may have a one-piece structure. That is, the third signal electrode 31 and the first signal electrode 11 can be formed in one patterning process, which is helpful for realizing high integration of the phase shifter. Further, the first reference electrodes 12 and the third reference electrodes 32 and the first signal electrode 11 and the third signal electrode 31 may be disposed in the same layer, and be made of the same material. That is, the first reference electrodes 12 and the third reference electrodes 32 may be formed while the first signal electrode 11 and the third signal electrode 31 are formed, so that a thickness of the phase shifter can be further reduced, and the integration of the phase shifter can be improved.

When the at least one first bias signal line 4 is electrically connected to the second main body portion, the equivalent circuit diagram is as shown in FIG. 7. The second feed port of the second feed structure 3 is equivalent to an impedance transformation structure. That is, the third and fourth sub-structures and the third reference electrodes 32 constitute resistors and capacitors connected in series and parallel. According to the principle for resistors connected in parallel, comparing with a case where the at least one first bias signal line 4 is connected to the first signal electrode 11, by connecting the at least one first bias signal line 4 to the second main body portion, the loss of the signal transmission for the first signal electrode 11 can be effectively reduced, and the shunting of the radio frequency signal by the at least one first bias signal line 4 can be significantly reduced, and the insertion loss of the whole device in the operating state can be reduced.

It should be noted that the first feed structure 2 and the second feed structure 3 are both CPW transmission lines, and may have the same structure. Only for convenience of distinguishing, a signal electrode in the first feed structure 2 is referred to as the second signal electrode 21, and the reference electrode is referred to as the second reference electrode 22; the signal electrode in the second feed structure 3 is referred to as the third signal electrode 31 and the reference electrode is referred to as the third reference electrode 32. The at least one first bias signal line 4 may be electrically connected to the first main body portion 211 or the second main body portion. For convenience of description, as an example, the at least one first bias signal line 4 is electrically connected to the first main body portion 211.

Figure 8:
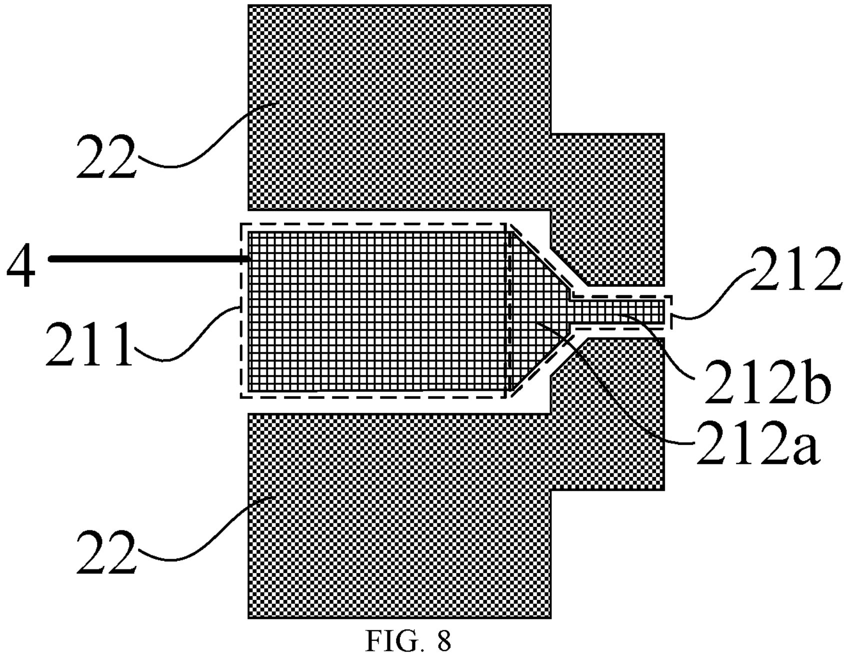
FIG. 8 is a schematic diagram showing a connection between a first bias signal line and a first feed structure according to an embodiment of the present disclosure.

In one example, FIG. 8 is a schematic diagram showing a connection between a first bias signal line 4 and a first feed structure 2 according to an embodiment of the present disclosure. As shown in FIG. 8, the first feed structure 2 adopts the CPW transmission line, so that in order to avoid the intersection and crosstalk between the at least one first bias signal line 4 and the second reference electrodes 22, the at least one first bias signal line 4 is connected to an end of the second signal electrode 21 away from the first signal electrode 11, and an orthographic projection of the at least one first bias signal line 4 on the first dielectric substrate 100 and an orthographic projection of each second reference electrode 22 on the first dielectric substrate 100 do not overlap with each other. In this way, it can be effectively avoided that the at least one first bias signal line 4 and each second reference electrode 22 forms a overlapping capacitance due to the overlapping of the at least one first bias signal line 4 and each second reference electrode 22; and the doping loss caused by the signal coupling can be effectively avoided. Similarly, when the at least one first bias signal line 4 is connected to the second main body portion, the at least one first bias signal line 4 is disposed on a side of the third signal electrode 31 away from the first signal electrode 11, and an orthographic projection of the at least one first bias signal line 4 on the first dielectric substrate 100 and an orthographic projection of each third reference electrode 32 on the first dielectric substrate 100 do not overlap with each other.

Figure 9:
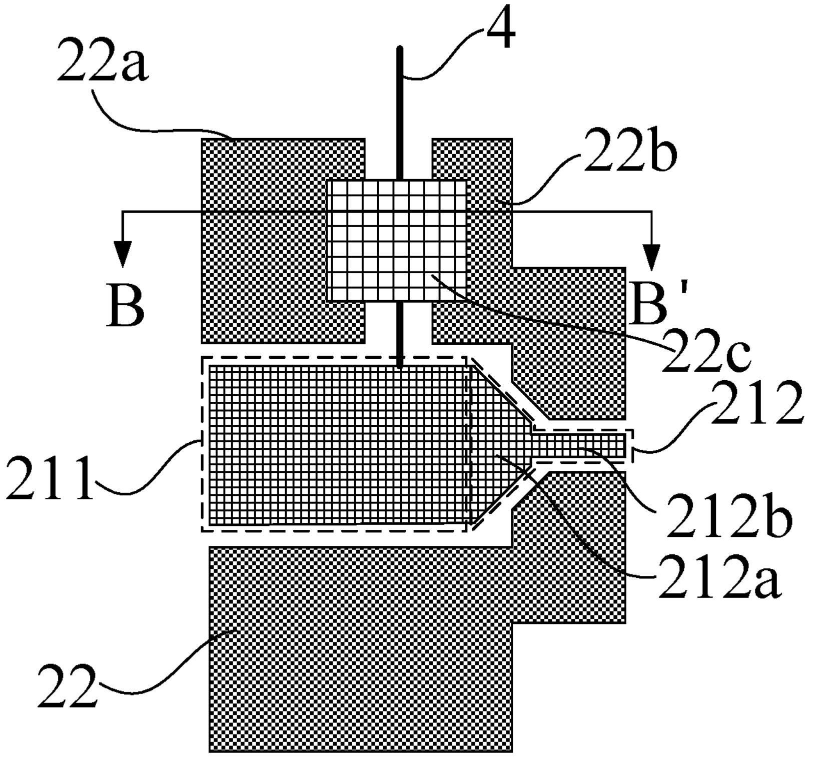
FIG. 9 is a schematic diagram showing a connection between a first bias signal line and a first feed structure according to an embodiment of the present disclosure.
Figure 10:
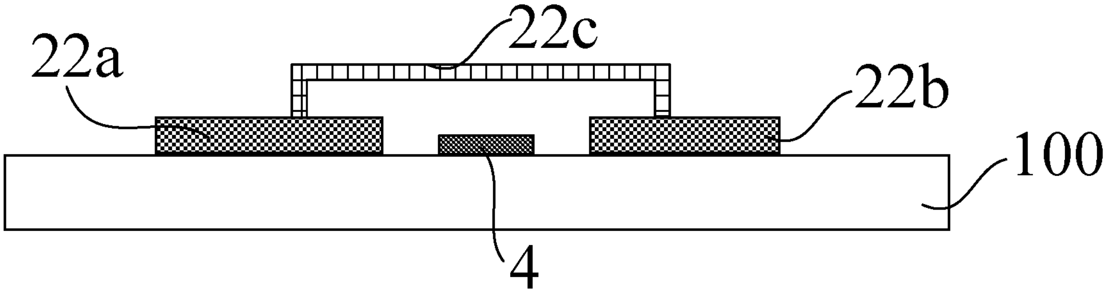
FIG. 10 is a cross-sectional view taken along a line B-B' of FIG. 9.

In an example, FIG. 9 is a schematic diagram showing a connection between a first bias signal line 4 and a first feed structure 2 according to an embodiment of the present disclosure. FIG. 10 is a cross-sectional view taken along a line B-B' of FIG. 9. As shown in FIGS. 9 and 10, one of the two second reference electrodes 22 includes a first electrode segment 22*a* and a second electrode segment 22*b* separated from each other, and a first bridge segment 22*c* connecting the first electrode segment 22*a* and the second electrode segment 22*b*, where an air gap is formed between the first bridge segment 22*c* and the first dielectric substrate 100, and the at least one first bias signal line may be connected to the second signal electrode 21 (the first main body portion 211) through a gap between the first electrode segment 22*a* and the second electrode segment 22*b*. At this time, a certain gap exists between the at least one first bias signal line 4 and the first bridge segment 22*c*, and the at least one first bias signal line 4 and the first bridge segment 22*c* are insulated from each other, so that the at least one first bias signal line 4 and the second reference electrode 22 can be separated from each other, a radio frequency signal can be effectively prevented from being coupled to the second reference electrode 22 through the at least one first bias signal line 4, and the insertion loss of the phase shifter can be significantly reduced.

Figure 11:
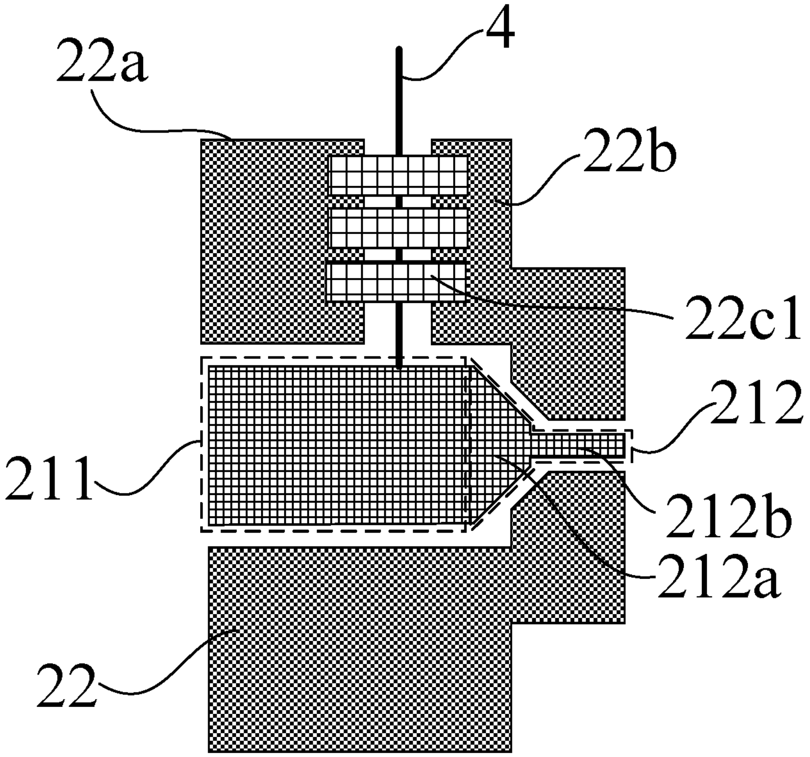
FIG. 11 is a schematic diagram showing a connection between a first bias signal line and a first feed structure according to an embodiment of the present disclosure.

Further, FIG. 11 is a schematic diagram showing another connection between a first bias signal line and a first feed structure according to an embodiment of the present disclosure. As shown in FIG. 11, in order to ensure a good connectivity between the first electrode segment 22*a* and the second electrode segment 22*b*, the first bridge segment 22*c* may be designed to be a structure consisting of a plurality of first bridge sub-segments 22*c*1 separated from each other, and any one of the first bridge sub-segments 22*c*1 electrically connects the first electrode segment 22*a* and the second electrode segment 22*b*. In this case, even if one of the first bridge sub-segments 22*c*1 is disconnected, the connectivity between the first electrode segment 22*a* and the second electrode segment 22*b* can be ensured by the other first bridge sub-segments 22*c*1.

Similarly, if the at least one first bias signal line 4 is electrically connected to the third signal electrode 31 (the second main body), one of the two third reference electrodes 32 may include a third electrode segment and a fourth electrode segment separated from each other, and a second bridge segment connecting the third electrode segment and the fourth electrode segment, where an air gap is formed between the second bridge segment and the first dielectric substrate 100, and the at least one first bias signal line may be connected to the third signal electrode 31 (the second main body portion) through a gap between the third electrode segment and the fourth electrode segment. At this time, a certain gap exists between the at least one first bias signal line 4 and the second bridge segment, and the at least one first bias signal line 4 and the second bridge segment are insulated from each other, so that the at least one first bias signal line 4 and the third reference electrode 32 can be separated from each other, a radio frequency signal can be effectively prevented from being coupled to the third reference electrode 32 through the at least one first bias signal line 4, and the insertion loss of the phase shifter can be significantly reduced.

Further, in order to ensure a good connectivity between the third electrode segment and the fourth electrode segment, the second bridge segment may be designed to be a structure consisting of a plurality of second bridge sub-segments separated from each other, and any one of the second bridge sub-segments electrically connects the third electrode segment and the fourth electrode segment. In this case, even if one of the second bridge sub-segments is disconnected, the connectivity between the third electrode segment and the fourth electrode segment can be ensured by the other second bridge sub-segments.

Figure 12:
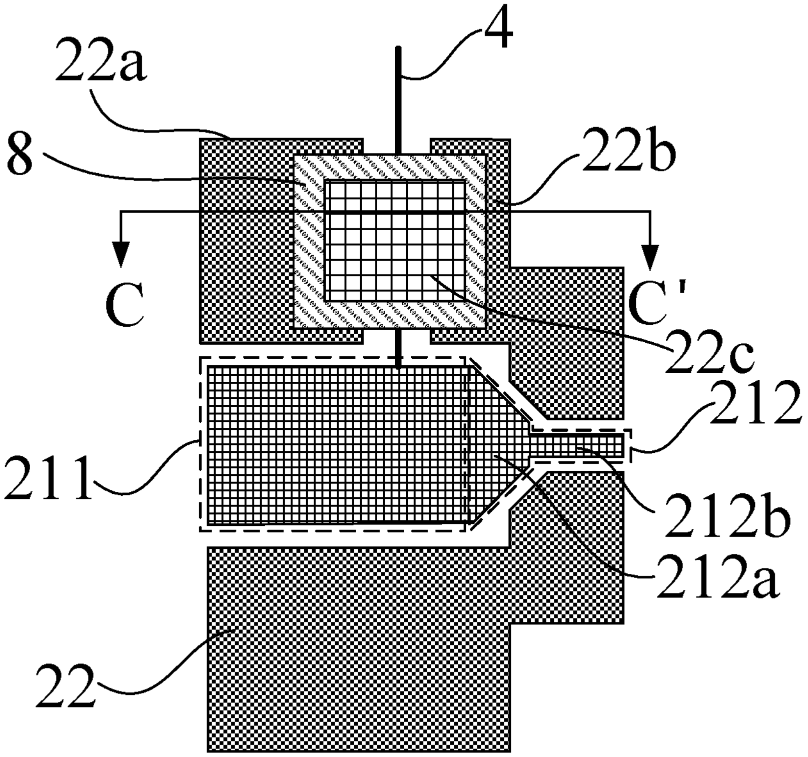
FIG. 12 is a schematic diagram showing a connection between a first bias signal line and a first feed structure according to an embodiment of the present disclosure.
Figure 13:
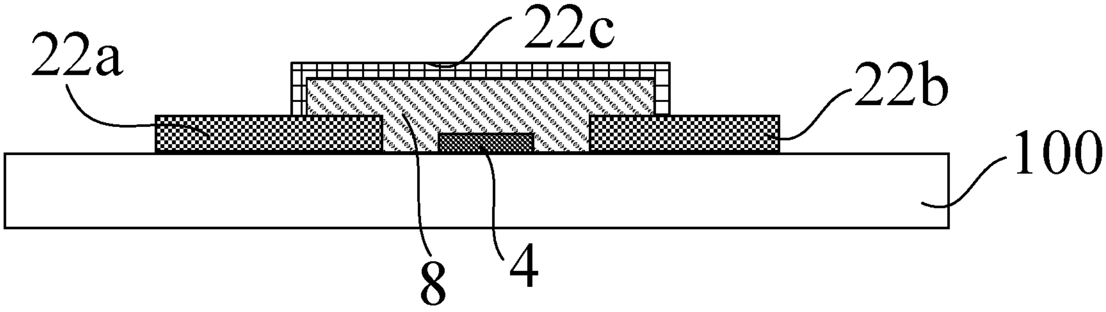
FIG. 13 is a cross-sectional view taken along a line C-C' of FIG. 12.

In an example, FIG. 12 is a schematic diagram showing a connection between a first bias signal line and a first feed structure according to an embodiment of the present disclosure. FIG. 13 is a cross-sectional view taken along a line C-C' of FIG. 12. As shown in FIGS. 12 and 13, substantially like the above example, the distinction is only that a second insulating layer 8 with a high dielectric constant or a high insulation is filled between the first bridge segment 22*c* and a layer where the at least one first bias signal line 4 is located. For example: a material of the second insulating layer 8 includes silicon nitride, resin (OC), or the like. That is, the air gap between the first bridge segment 22*c* and the at least one first bias signal line 4 is filled with the second insulating layer 8, so that the problem of increased crosstalk loss caused by the shunt crosstalk of the radio frequency signal can effectively eliminated, and the performance of the device can be effectively improved.

Similarly, when the at least one first bias signal line 4 is electrically connected to the third signal electrode 31 (the second main body portion), a third insulating layer with a high dielectric constant or a high insulativity is filled between the second bridge segment and the layer where the at least one first bias signal line 4 is located. For example: a material of the third insulating layer includes silicon nitride, resin (OC), or the like. That is, the air gap between the second bridge segment and the at least one first bias signal line 4 is filled with the third insulating layer, so that the problem of increased crosstalk loss caused by the shunt crosstalk of the radio frequency signal is effectively avoided, and the performance of the device is effectively improved.

Figure 14:
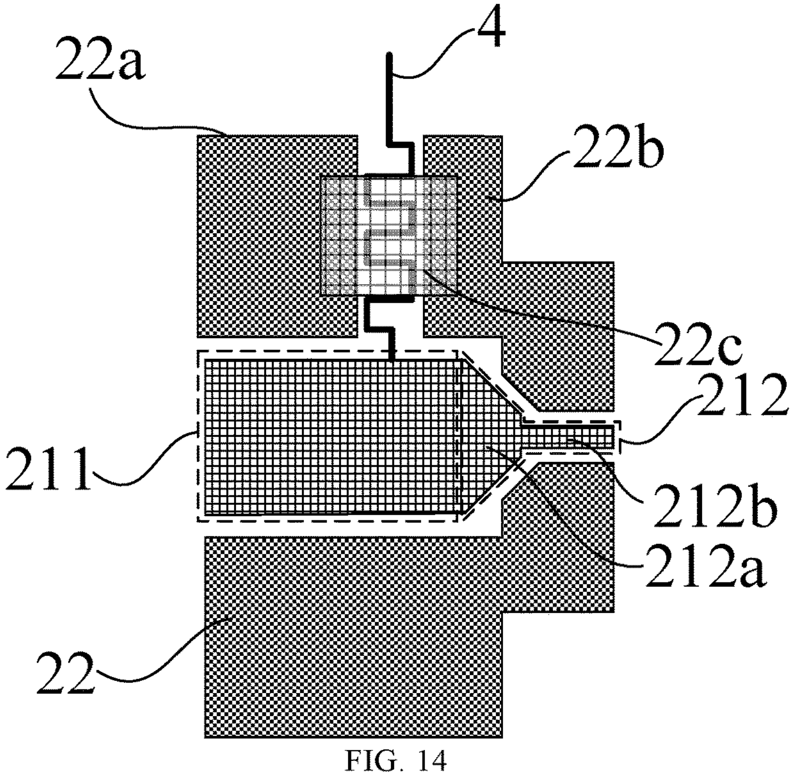
FIG. 14 is a schematic diagram showing a connection between a first bias signal line and a first feed structure according to an embodiment of the present disclosure.

In some examples, FIG. 14 is a schematic diagram showing a connection between a first bias signal line 4 and a first feed structure 2 according to an embodiment of the present disclosure. As shown in FIG. 14, no matter which of the above manners is adopted in the phase shifter in the embodiment of the present disclosure, the at least one first bias signal line 4 may be a meandering line. That is, an inductance value (that is, Lx in the equivalent circuit) of the at least one first bias signal line 4 may be increased, so as to improve the blocking effect on the radio frequency signal, prevent the intensity of the radio frequency signal from being reduced due to the crosstalk of the radio frequency signal. The at least one first bias signal line 4 is the meandering line, so that the inductance value is increased and a resistance value is increased, which is beneficial to further improving the isolation capacity of the alternating current signal and the direct current signal.

In some examples, each film bridge 13 in embodiments of the present disclosure includes the bridge deck and at least one connection arm. In the embodiment of the present disclosure, each film bridge 13 includes two connection arms as an example. For convenience of description, the two connection arms are respectively referred to as a first connection arm and a second connection arm. The first connection arm and the second connection arm are respectively connected to two ends of the bridge deck, and orthographic projections of the first connection arm and the second connection arm on the first dielectric substrate 100 are respectively located within orthographic projections of the two second reference electrodes 22 on the first dielectric substrate 100. Alternatively, each film bridge 13 in the embodiment of the present disclosure may also include only one of the first and second connection arms.

In some examples, the first signal electrode 11, the first reference electrodes 12, the at least one first bias signal line 4, the second signal electrode 21, the second reference electrodes 22, the third signal electrode 31, and the third reference electrodes 32 in the embodiments of the present disclosure may be disposed in the same layer and made of the same material, so that the first signal electrode 11, the first reference electrodes 12, the at least one first bias signal line 4, the second signal electrode 21, the second reference electrodes 22, the third signal electrode 31, and the third reference electrodes 32 may be formed through one patterning process.

In some examples, the first reference electrodes 12, the second reference electrodes 22, and the third reference electrodes 32 may be ground electrodes, that is, all of the first reference electrodes 12, the second reference electrodes 22, and the third reference electrodes 32 may be connected to a ground signal, which is simple in structure and convenient to control.

Figure 15:
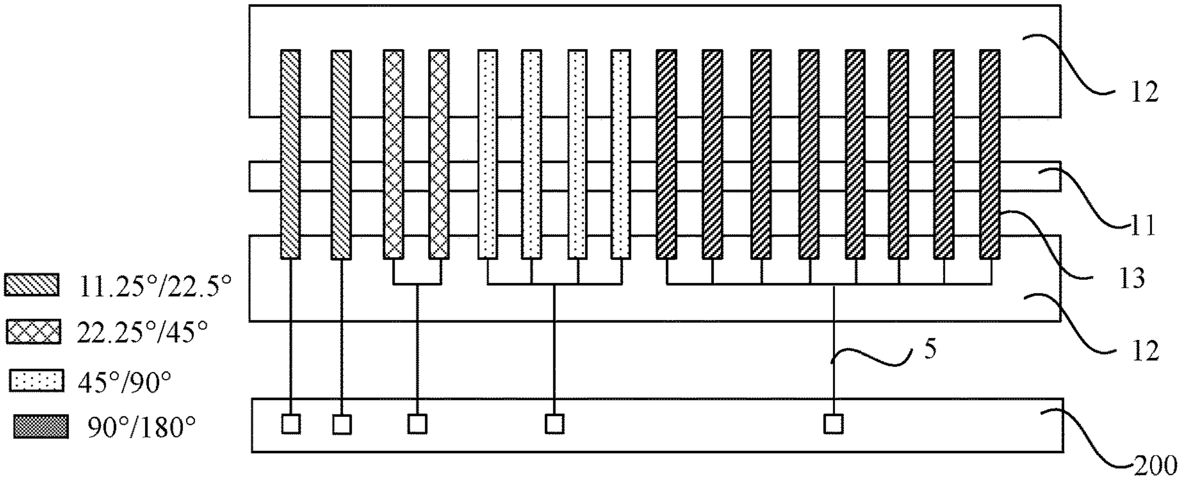
FIG. 15 is a schematic diagram of a phase shifting structure of a phase shifter according to an embodiment of the present disclosure.

In some examples, FIG. 15 is a schematic diagram of a phase shifting structure of a phase shifter of an embodiment of the present disclosure. As shown in FIG. 15, the phase shifter further includes at least one second bias signal line 5, and each second bias signal line 5 is connected to all of film bridges 13 in a corresponding phase control unit 10 to supply a second bias voltage to all the film bridges 13 of the phase control unit 10. A phase shift of the microwave signal is realized by applying direct current bias voltages to the at least one first bias signal line 4 and the at least one second bias signal line 5. Specifically, as shown in FIG. 15, in the embodiment of the present disclosure, as an example, the phase shifter is a four-bit phase shifter, including four phase control units 10, that is, a phase control unit 10 with a phase shift amount of 11.25° to 22.5°, a phase control unit 10 with a phase shift amount of 22.5° to 45°, a phase control unit 10 with a phase shift amount of 45° to 90°, and a phase control unit 10 with a phase shift amount of 90° to 180°, and the four phase control units 10 includes 1, 2, 4, and 8 film bridges 13, respectively. The phase shift amount of the capacitor generated by each film bridge 13 and the first signal electrode 11 is 11.25°, so that the 11.25° corresponds to one film bridge 13, and the phase shift amount generated by the electromagnetic wave passing through the leftmost two film bridges 13 is 22.5°; the second phase control unit 10 includes 2 short-circuited film bridges 13, after passing through the two leftmost film bridges 13, the electromagnetic wave passes through the first film bridge 13 to the second film bridge 13 of the second phase control unit 10, so that the phase shift amount is increased from 22.5° to 45°, and the variation is 22.5°; the third phase control unit 10 includes 4 short-circuited film bridges 13, after passing through the two leftmost film bridges 13 and the second phase control unit 10, the electromagnetic wave passes through the first film bridge 13 to the fourth film bridge 13 of the third phase control unit 10, so that the phase shift amount is increased from 45° to 90°, and the variation is 45°; the fourth phase control unit 10 includes 8 short-circuited film bridges 13, after passing through the two leftmost film bridges 13, the second phase control unit 10 and the third phase control unit 10, the electromagnetic wave passes through the first film bridge 13 to the eighth film bridge 13 of the fourth phase control unit 10, so that the phase shift amount is increased from 90° to 180°, and the variation is 90°.

In a second aspect, an embodiment of the present disclosure provides an electronic device, which includes the phase shifter.

The electronic device in the embodiment of the present disclosure includes the phase shifter, so that the loss of the signal transmission for the first signal electrode 11 can be significantly reduced, and the radiation efficiency of the antenna can be improved.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A phase shifter, comprising:

a first dielectric substrate; and a first feed structure, a second feed structure and a phase shifting structure, which are all arranged on the first dielectric substrate; wherein the phase shifting structure comprises:

a first signal electrode and at least one first reference electrode on at least one side of an extending direction of the first signal electrode;

a first insulating layer on a side of the first dielectric substrate, where the first signal electrode and the at least one first reference electrode are located; wherein the first insulating layer covers the at least one first reference electrode and the first signal electrode; and at least one phase control unit on a side of the first insulating layer away from the first dielectric substrate; wherein each of the at least one phase control unit comprises at least one film bridge; there is a gap between a bridge deck of each of the at least one film bridge and the first insulating layer; and an orthographic projection of a bridge deck of each of the at least one film bridge on the first dielectric substrate overlaps with orthographic projections of the first signal electrode and the at least one first reference electrode on the first dielectric substrate;

the first feed structure comprises a second signal electrode; the second feed structure comprises a third signal electrode; and the second signal electrode and the third signal electrode are connected to a first end and a second end of the first signal electrode, respectively; and the phase shifter further comprises at least one first bias signal line connected to the second signal electrode or the third signal electrode.

2. The phase shifter of claim 1, wherein the second signal electrode comprises a first main body portion, and a first feed port connected to the first main body portion and the first end of the first signal electrode; and a line width of a portion of the first feed port close to the first signal electrode is not greater than that of a portion of the first feed port away from the first signal electrode; and the third signal electrode comprises a second main body portion, and a second feed port connected to the second main body portion and the second end of the first signal electrode; and a line width of a portion of the second feed port close to the first signal electrode is not greater than that of a portion of the second feed port away from the first signal electrode.

3. The phase shifter of claim 2, wherein the first feed port comprises a first sub-structure and a second sub-structure connected to each other; the first sub-structure is connected to the first main body portion; the second sub-structure is connected to the first end of the first signal electrode; a line width of the second sub-structure is smaller than that of any portion of the first sub-structure; and a line width of the first sub-structure is gradually decreased in a direction from the first main body portion to the first signal electrode; and the second feed port comprises a third sub-structure and a fourth sub-structure connected to each other; the third sub-structure is connected to the second main body portion; the fourth sub-structure is connected to the second end of the first signal electrode; a line width of the fourth sub-structure is smaller than that of any portion of the third sub-structure; and a line width of the third sub-structure is gradually decreased in a direction from the second main body portion to the first signal electrode.

4. The phase shifter of claim 3, wherein the first feed structure further comprises at least one second reference electrode on at least one side of an extending direction of the second signal electrode; and the second feed structure further comprises at least one third reference electrode on at least one side of an extending direction of the third signal electrode.

5. The phase shifter of claim 2, wherein the at least one first bias signal line is connected to the first main body portion or the second main body portion.

6. The phase shifter of claim 5, wherein the first feed structure further comprises at least one second reference electrode on at least one side of an extending direction of the second signal electrode; and the second feed structure further comprises at least one third reference electrode on at least one side of an extending direction of the third signal electrode.

7. The phase shifter of claim 2, wherein the first feed structure further comprises at least one second reference electrode on at least one side of an extending direction of the second signal electrode; and the second feed structure further comprises at least one third reference electrode on at least one side of an extending direction of the third signal electrode.

8. The phase shifter of claim 7, wherein when the at least one first bias signal line is connected to the second signal electrode, one of the at least one second reference electrode comprises a first electrode segment and a second electrode segment separated from each other, and a first bridge segment connected between the first electrode segment and the second electrode segment; an orthographic projection of the at least one first bias signal line on the first dielectric substrate passes through a space between orthographic projections of the first electrode segment and the second electrode segment on the first dielectric substrate; and the at least one first bias signal line and the first bridge segment are insulated from each other; and when the at least one first bias signal line is connected to the third signal electrode, one of the at least one third reference electrode comprises a third electrode segment and a fourth electrode segment separated from each other, and a second bridge segment connected between the third electrode segment and the fourth electrode segment; the orthographic projection of the at least one first bias signal line on the first dielectric substrate passes through a space between orthographic projections of the third electrode segment and the fourth electrode segment on the first dielectric substrate; and the at least one first bias signal line and the second bridge segment are insulated from each other.

9. The phase shifter of claim 1, wherein the first feed structure further comprises at least one second reference electrode on at least one side of an extending direction of the second signal electrode; and the second feed structure further comprises at least one third reference electrode on at least one side of an extending direction of the third signal electrode.

10. The phase shifter of claim 9, wherein when the at least one first bias signal line is connected to the second signal electrode, one of the at least one second reference electrode comprises a first electrode segment and a second electrode segment separated from each other, and a first bridge segment connected between the first electrode segment and the second electrode segment; an orthographic projection of the at least one first bias signal line on the first dielectric substrate passes through a space between orthographic projections of the first electrode segment and the second electrode segment on the first dielectric substrate; and the at least one first bias signal line and the first bridge segment are insulated from each other; and when the at least one first bias signal line is connected to the third signal electrode, one of the at least one third reference electrode comprises a third electrode segment and a fourth electrode segment separated from each other, and a second bridge segment connected between the third electrode segment and the fourth electrode segment; the orthographic projection of the at least one first bias signal line on the first dielectric substrate passes through a space between orthographic projections of the third electrode segment and the fourth electrode segment on the first dielectric substrate; and the at least one first bias signal line and the second bridge segment are insulated from each other.

11. The phase shifter of claim 9, wherein when the at least one first bias signal line is connected to the second signal electrode, one of the at least one second reference electrode comprises the first electrode segment and the second electrode segment separated from each other, and the first bridge segment connected between the first electrode segment and the second electrode segment, a second insulating layer is filled between the first bridge segment and a layer where the at least one first bias signal line is located; and when the at least one first bias signal line is connected to the third signal electrode, one of the at least one third reference electrode comprises the third electrode segment and the fourth electrode segment separated from each other, and the second bridge segment connected between the third electrode segment and the fourth electrode segment, a third insulating layer is filled between the second bridge segment and the layer where the at least one first bias signal line is located.

12. The phase shifter of claim 9, wherein when the at least one first bias signal line is connected to the second signal electrode, one of the at least one second reference electrode comprises the first electrode segment and the second electrode segment separated from each other, and the first bridge segment connected between the first electrode segment and the second electrode segment, the first bridge segment comprises a plurality of first bridge sub-segments separated from each other, and the first electrode segment is electrically connected to the second electrode segment by any one of the plurality of first bridge sub-segments; and when the at least one first bias signal line is connected to the third signal electrode, one of the at least one third reference electrode comprises the third electrode segment and the fourth electrode segment separated from each other, and the second bridge segment connected between the third electrode segment and the fourth electrode segment, the second bridge segment comprises a plurality of second bridge sub-segments separated from each other, and the third electrode segment is electrically connected to the fourth electrode segment by any one of the plurality of second bridge sub-segments.

13. The phase shifter of claim 9, wherein an orthographic projection of the at least one first bias signal line on the first dielectric substrate does not overlap with orthographic projections of the at least one second reference electrode and the at least one third reference electrode on the first dielectric substrate.

14. The phase shifter of claim 9, wherein the at least one second reference electrode is on two sides of an extending direction of the second signal electrode; and/or the at least one third reference electrode is on two sides of an extending direction of the third signal electrode.

15. The phase shifter of claim 1, wherein the at least one first bias line each comprises a meandering line.

16. An electronic device, comprising the phase shifter of claim 1.

17. The phase shifter of claim 1, wherein the at least one phase control unit comprises a plurality of phase control units; and the numbers of the film bridges in different phase control units are different from each other.

18. The phase shifter of claim 1, further comprising at least one second bias signal line;

wherein all of the film bridges in each phase control unit are electrically connected to a same second bias signal line.

19. The phase shifter of claim 1, wherein the first signal electrode, the second signal electrode, the third signal electrode and the at least one first bias signal line are in a same layer and are made of a same material.

20. The phase shifter of claim 1, wherein the at least one first reference electrode is on both sides of the extending direction of the first signal electrode.

* * * * *